(12) United States Patent
Williams (10) Patent No.: US 6,598,241 B1
(45) Date of Patent: Jul. 29, 2003

(54) COMPOSITE WATER CLOSET FLANGES AND METHODS FOR FORMING THE SAME

(76) Inventor: Robert M. Williams, 7034 E. Court St., Davison, MI (US) 48423

( * ) Notice: Subject to any disclaimer, the term of this patent is extended or adjusted under 35 U.S.C. 154(b) by 0 days.

(21) Appl. No.: 10/078,630

(22) Filed: Feb. 19, 2002

(51) Int. Cl.[7] ............................................. E03D 11/16
(52) U.S. Cl. ...................................................... 4/252.1
(58) Field of Search .............................. 4/252.1, 252.4, 4/252.6; 285/56

(56) References Cited

U.S. PATENT DOCUMENTS

| | | | |
|---|---|---|---|
| 1,149,269 A | * 8/1915 | Klindt | 285/56 |
| 3,762,684 A | 10/1973 | Stein | 251/148 |
| 3,775,780 A | 12/1973 | McErwen | 4/252 R |
| 3,967,836 A | 7/1976 | Izzi, Sr. | 285/12 |
| 4,212,486 A | 7/1980 | Logsdon | 285/4 |
| 4,233,697 A | 11/1980 | Cornwall | 4/293 |
| 4,261,598 A | 4/1981 | Cornwall | 285/56 |
| 4,406,480 A | 9/1983 | Izzi | 285/12 |
| 4,648,139 A | 3/1987 | Stokes | 4/252 R |
| 5,018,224 A | 5/1991 | Hodges | 4/252 R |
| 5,090,739 A | 2/1992 | Pollard | 285/56 |
| 5,185,890 A | 2/1993 | Dismore et al. | 4/252.5 |
| 6,052,839 A | * 4/2000 | Teskey | 4/252.5 |

* cited by examiner

Primary Examiner—Charles E. Phillips
(74) Attorney, Agent, or Firm—Myers Bigel Sibley & Sajovec (57) ABSTRACT

A composite water closet flange includes a hub member having a hub member axis and including a connecting portion and a through-passage extending through the connecting portion. The connecting portion includes a shoulder extending radially outwardly. A plurality of locking tabs extend radially outwardly and are axially spaced apart from the shoulder. A ring member is mounted on the hub member and includes an inner peripheral portion surrounding the connecting portion and defining an opening. The inner peripheral portion includes a plurality of engagement portions interposed between the shoulder and respective ones of the locking tabs. A key slot is defined in the inner peripheral portion and communicates with the opening. The key slot is sized and configured to receive at least one of the plurality of locking tabs therethrough.

53 Claims, 10 Drawing Sheets

COMPOSITE WATER CLOSET FLANGES AND METHODS FOR FORMING THE SAME

FIELD OF THE INVENTION

The present invention relates to water closet flanges and, more particularly, to water closet flanges including multiple, coupled components.

BACKGROUND OF THE INVENTION

Figure 11:
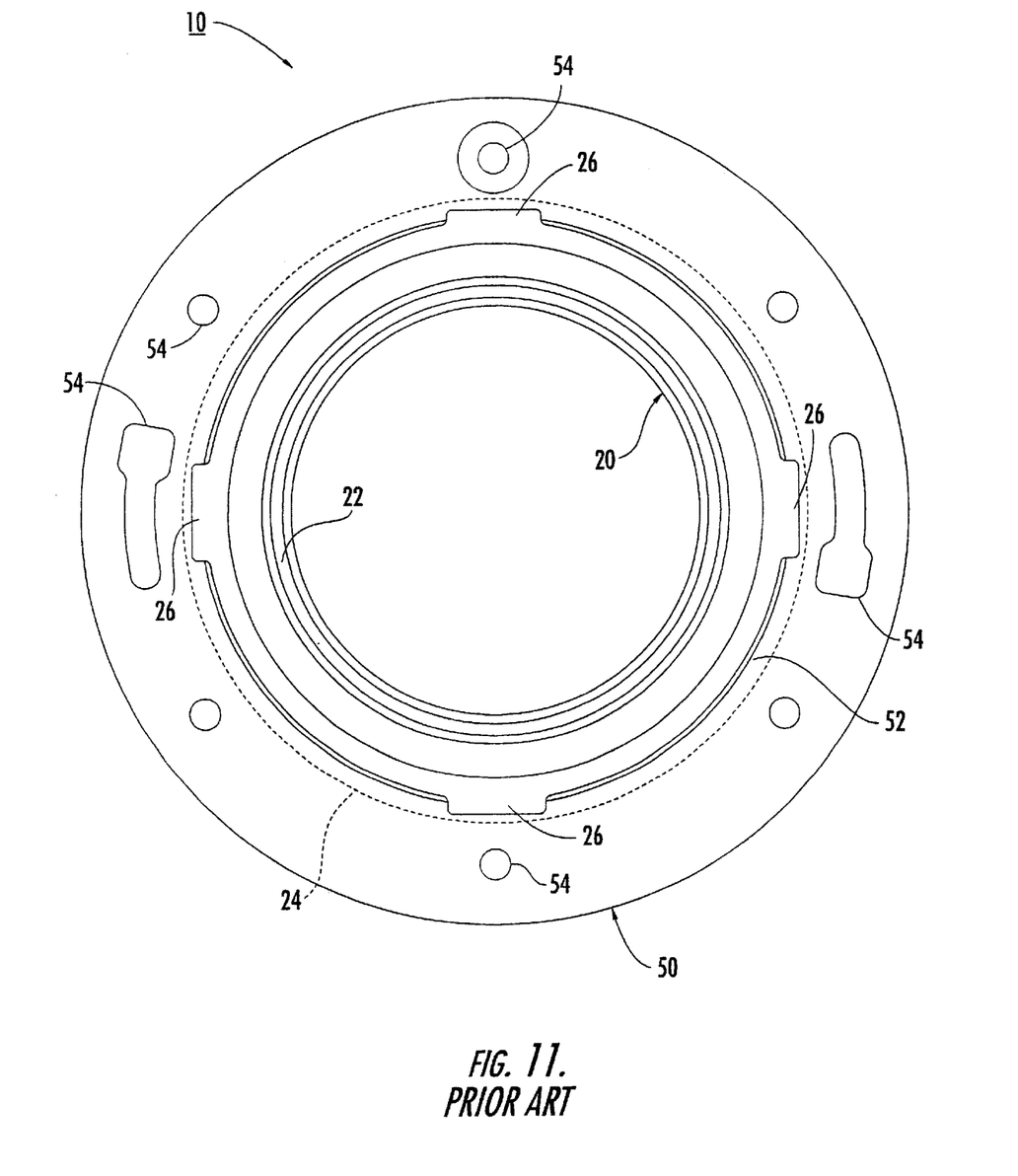
FIG. 11 is a bottom plan view of a composite water closet flange of the prior art.

Water closet flanges are used to join water closets or toilet bowls to the open ends of sewer pipes, for example, in residential or commercial structures. It is known to form multiple component or composite water closet flanges. An exemplary composite water closet flange 10 is shown in FIG. 11, which is a bottom plan view thereof. The water closet flange 10 includes a hub member 20 including a tubular portion 22 and a radially outwardly extending flange portion 24 on the upper end of the hub member 20. A plurality of spaced apart locking tabs 26 also extend radially outwardly from the hub member 20 and are positioned axially below the flange portion 24. A ring member 50 surrounds the upper portion of the hub member 20. The ring member 50 has an inner peripheral edge 52 defining an opening and having an inner diameter selected such that portions of the ring member 50 are interposed between the flange 24 and each of the locking tabs 26. In this manner, the flange 24 and the locking tabs 26 cooperate to secure the ring member 50 on the upper end of the hub member 20. The tubular portion 22 may be adapted to fit tightly over the sewer pipe. The ring member 50 includes bolt holes 54 for receiving bolts to secure the water closet to the ring member 50.

The hub member 20 may be formed of polyvinylchloride (PVC) or other suitable polymeric material with the ring member 50 being formed of metal. Typically, the water closet flange 10 is assembled by forcing the ring member 50 over the locking tabs 26 such that the locking tabs 26 are temporarily deflected, allowing the ring member to seat between the flange portion 24 and the locking tabs 26. Generally, it is preferable to provide at least four locking tabs 26, allowing the ring member to seat between the flange portion 24 and the locking tabs 26 to provide a secure and stable joinder between the hub member 20 and the ring member 50. As a result, it is typically necessary to deflect two or more of the locking tabs 26, requiring substantial amounts of force (e, using a mallet). The locking tabs 26 may be frequently broken, in which case the hub member 20 typically must be discarded.

SUMMARY OF THE INVENTION

According to embodiments of the present invention, a composite water closet flange includes a hub member having a hub member axis and including a connecting portion and a through-passage extending through the connecting portion. The connecting portion includes a shoulder extending radially outwardly. A plurality of locking tabs extend radially outwardly and are axially spaced apart from the shoulder. A ring member is mounted on the hub member and includes an inner peripheral portion surrounding the connecting portion and defining an opening. The inner peripheral portion includes a plurality of engagement portions interposed between the shoulder and respective ones of the locking tabs. A key slot is defined in the inner peripheral portion and communicates with the opening. The key slot is sized and configured to receive at least one of the plurality of locking tabs therethrough.

According to further embodiments of the present invention, a composite water closet flange includes a hub member having a hub member axis and including a connecting portion and a through-passage extending through the connecting portion. The connecting portion includes a radially extending shoulder. A plurality of radially extending locking tabs are axially spaced apart from the shoulder. A ring member is mounted on the hub member and includes a plurality of engagement portions interposed between the shoulder and respective ones of the locking tabs. A key slot is defined in the ring member. The key slot is sized and configured to receive at least one of the plurality of locking tabs therethrough.

According to further embodiments of the present invention, a hub member for use with a ring member having a key slot to form a composite water closet flange is provided. The hub member has a hub member axis and includes a connecting portion and a through-passage extending through the connecting portion. The connecting portion includes a shoulder extending radially outwardly. A primary locking tab extends radially outwardly and is axially spaced apart from the shoulder. The primary locking tab is sized and configured to allow the primary locking tab to pass through the key slot. A secondary locking tab extends radially outwardly and is axially spaced apart from the shoulder. The secondary locking tab is sized and configured to prevent the secondary locking tab from passing through the key slot.

According to further embodiments of the present invention, a ring member for use with a hub member including a plurality of locking tabs to form a composite water closet flange is provided. The ring member includes an inner peripheral portion adapted to surround the hub member and defines an opening. A key slot is defined in the inner peripheral portion and communicates with the opening. The key slot is sized and configured to receive at least one of the plurality of locking tabs therethrough.

According to method embodiments of the present invention, a method of assembling a water closet flange includes providing a hub member having a hub member axis and including a connecting portion and a through-passage extending through the connecting portion. The connecting portion includes a shoulder extending radially outwardly. First and second locking tabs extend radially outwardly and are axially spaced apart from the shoulder. A ring member is provided including an inner peripheral portion defining an opening and a key slot defined in the inner peripheral portion and communicating with the opening. The key slot is sized and configured to receive at least one of the first and second locking tabs therethrough. The connecting portion of the hub member is positioned in the opening of the ring member such that the inner peripheral portion is interposed between the second locking tab and the shoulder. The connecting portion of the hub member is positioned in the opening of the ring member such that the first locking tab is axially aligned with the key slot. The first locking tab is axially displaced through the key slot.

Objects of the present invention will be appreciated by those of ordinary skill in the art from a reading of the figures and the detailed description of the preferred embodiments which follow, such description being merely illustrative of the present invention.

DETAILED DESCRIPTION OF THE PREFERRED EMBODIMENTS

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

With reference to FIGS. 1–4, a multi-component or composite water closet flange 100 according to embodiments of the present invention is shown therein. The water closet flange 100 includes a hub member 120 and a ring member 150 mounted on the hub member 120. The hub member 120 and the ring member 150 are relatively configured to facilitate assembly of the water closet flange 100 using methods in accordance with the present invention.

The water closet flange 100 may be adapted to join a water closet of conventional or other design to a sewer pipe end. The hub member 120 and the ring member 150 may be formed of different materials to reduce cost and/or improve performance characteristics of the water closet flange.

Figure 4:
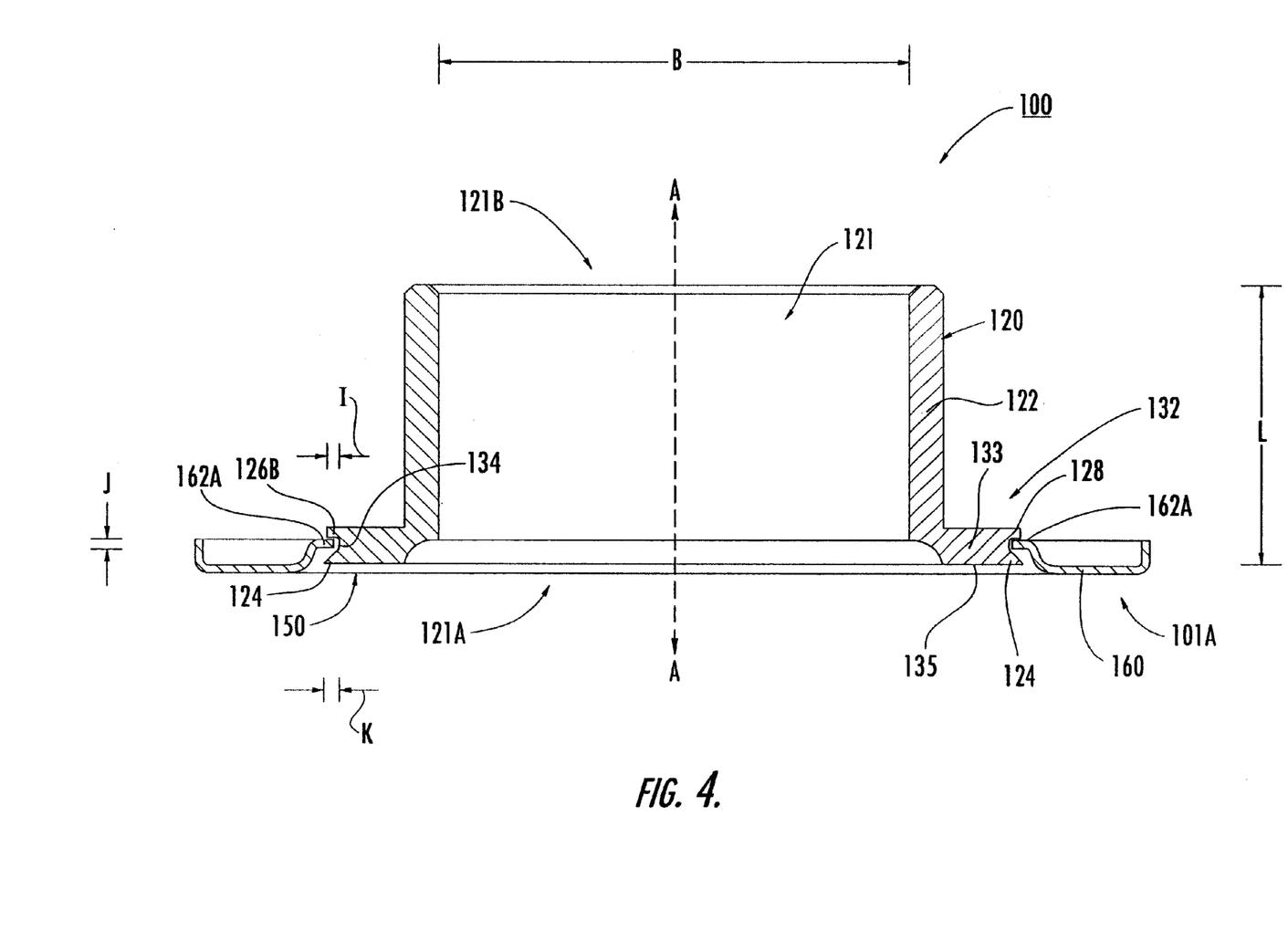
FIG. 4 is a cross-sectional view of the water closet flange of FIG. 1 taken along the line 4—4 of FIG. 3.
Figure 5:
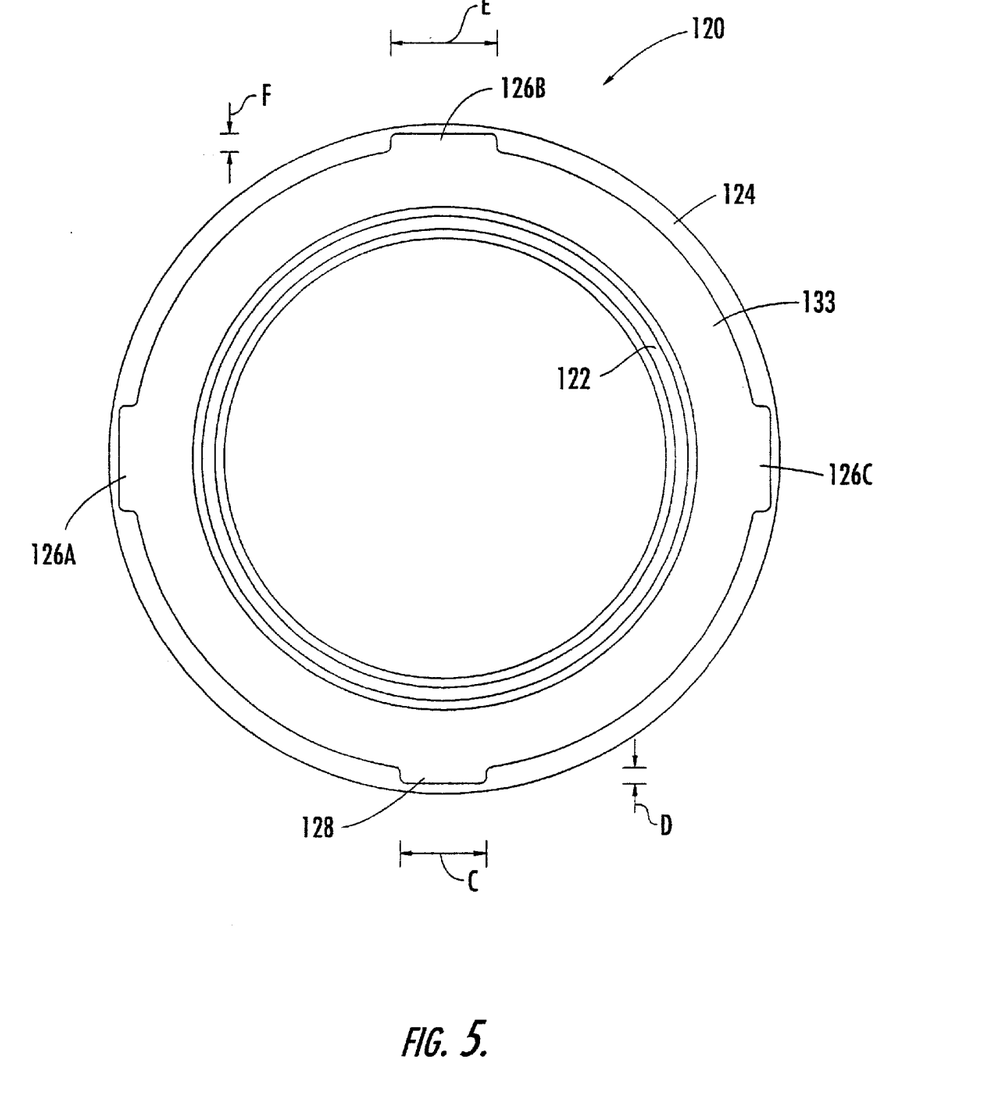
FIG. 5 is a bottom plan view of a hub member forming a part of the water closet flange of FIG. 1.

Turning to the hub member 120 in more detail and with additional reference to FIG. 5, the hub member 120 has a hub member axis A—A (FIG. 4). The hub member 120 includes a tubular body portion 122 and a connecting portion 132. The body portion 122 and the connecting portion 132 are preferably integrally formed as illustrated. A through-passage 121 extends through the hub member 120 from a top opening 121A to a bottom opening 121B. Preferably, the through-passage 121 is cylindrical as shown and the hub member axis A—A extends along the center axis of the through-passage 121. Preferably, the through-passage 121 has a length L (FIG. 4) of between about 2.000 and 2.750 inches and a diameter B (FIG. 4) of between about 3.000 and 4.500 inches.

The connecting portion 132 includes a flange 133 located adjacent the upper end of the hub member 120. The flange 133 extends radially outwardly (with respect to the hub member axis A—A) from the body portion 122. A circular shoulder 124 extends radially outwardly from the flange 133. A plurality of circumferentially spaced apart locking tabs 126A, 126B, 126C, 128 extend radially outwardly from the flange 133 as well. The locking tabs 126A, 126B, 126C, 128 are axially spaced apart (with respect to the hub member axis A—A) from the shoulder 124 so as to define a circumferential channel 134 (FIG. 4) therebetween. Preferably, four locking tabs 126A, 126B, 126C, 128 are provided. However, more or fewer locking tabs may be used. Preferably, the locking tabs 126A, 126B, 126C, 128 are spaced apart equidistantly about the periphery of the connecting portion 132.

Figure 6:
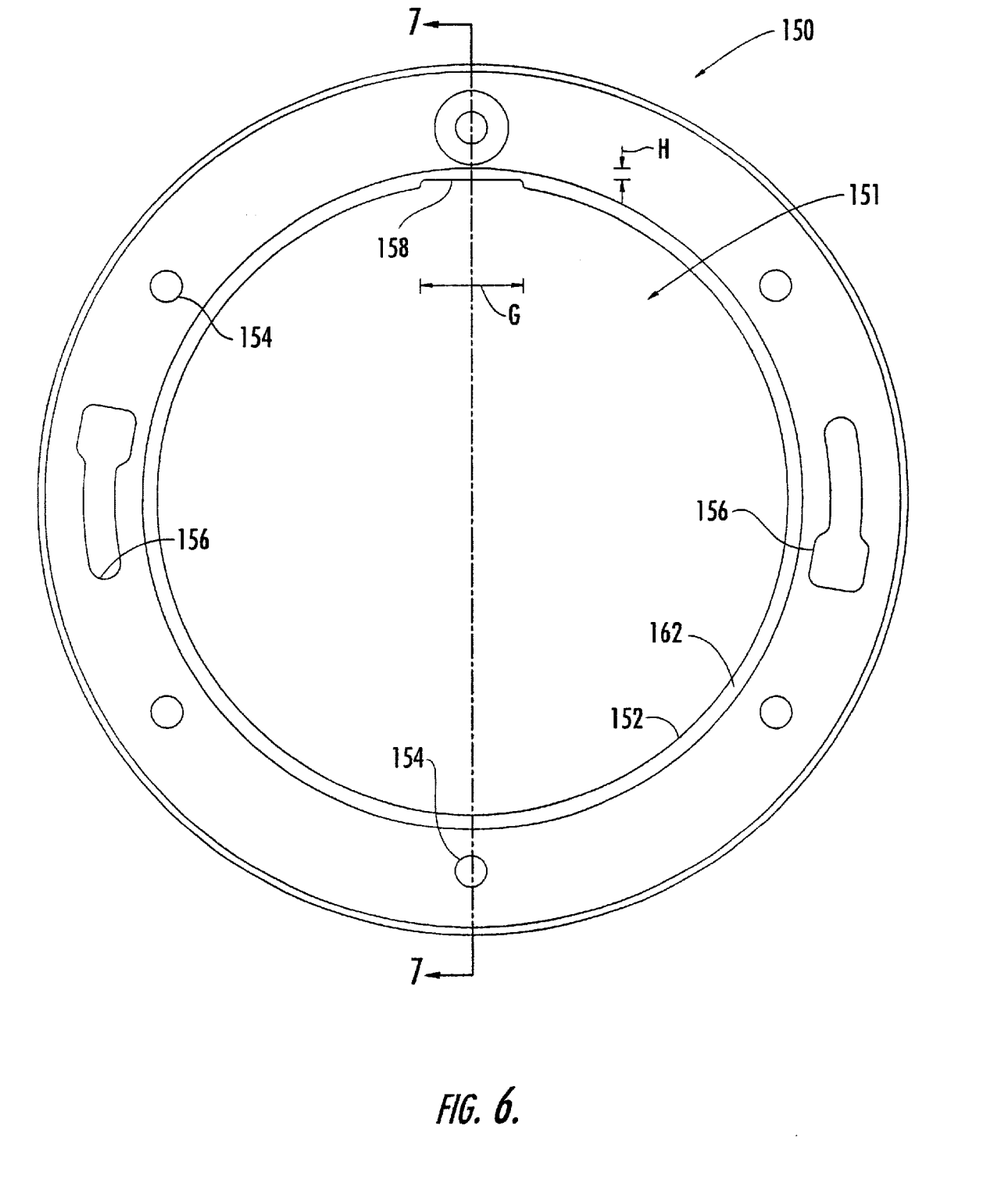
FIG. 6 is a top plan view of a ring member forming a part of the water closet flange of FIG. 1.
Figure 7:
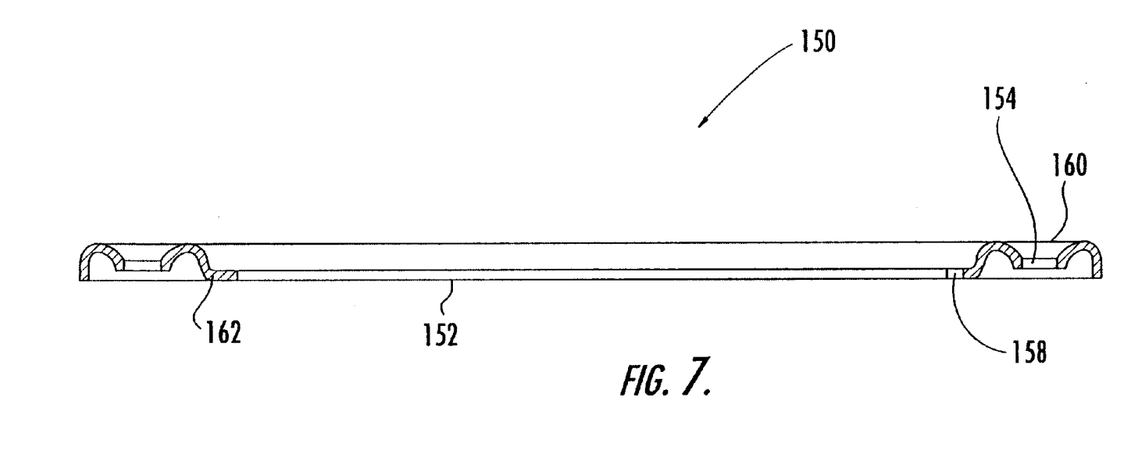
FIG. 7 is a cross-sectional view of the ring member of FIG. 6 taken along the line 7—7 of FIG. 6.
Figure 8:
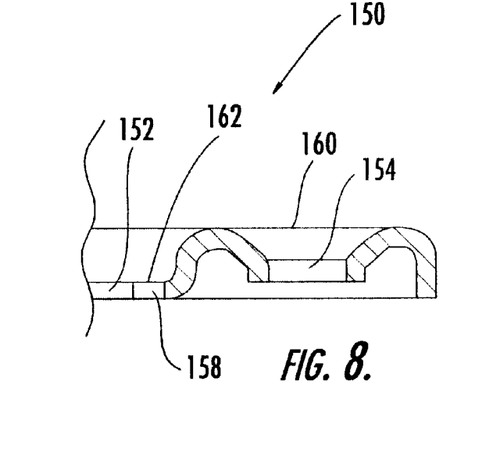
FIG. 8 is a fragmentary, enlarged cross-sectional view of the ring member of FIG. 6.

Turning to the ring member 150 in more detail and with additional reference to FIGS. 6–8, the ring member 150 includes a circular ring body 160. A circular, inner peripheral portion 162 extends radially inwardly (with respect to the axis A—A) to an inner peripheral edge 152. The inner peripheral edge 152 defines an opening 151. The inner peripheral edge 152 further defines a radially outwardly (with respect to the axis A—A) extending key slot 158 communicating with the opening 151. A plurality of mounting holes 154, 156 are formed in the ring body 160. Preferably, at least some of the mounting holes 154, 156 are centered along a bolt circle having a diameter of between about 6.130 and 6.140 inches.

As best seen in FIGS. 1–4, when the water closet flange 100 is fully assembled, the ring member 150 is mounted on the hub member 120 such that at least engagement portions 162A (FIG. 4) of the inner peripheral portion 162 are captured in the channel 134 between the shoulder 124 and the locking tabs 126, 128. The ring member 150 and the hub member 120 are relatively positioned such that the key slot 158 is offset from each of the locking tabs 126, 128. In this manner, the locking tabs 126, 128 in cooperation with the shoulder 124 serve to prevent or resist deliberate or inadvertent separation of the ring member 150 from the hub member 120. The ring member 150 may be secured to a water closet using suitable fasteners inserted through one or more of the holes 156 and such that the opening 121A is positioned adjacent the drain opening of the water closet. The hub member body 122 may be inserted into a drain pipe or placed over a drain pipe such that the drain pipe is received in the through-passage 121. Preferably, the hub member body 122 is adapted to fit snugly on or in the drain pipe to secure the water closet flange 100 to the drain pipe.

Preferably, the shoulder 124 overlaps the ring member 150 an overlap distance K (FIG. 4) of at least 0.114 inch and, more preferably, of between about 0. 119 and 0. 125 inch. Preferably, each of the locking tabs 126A, 126B, 126C, 128 overlaps the ring member 150 a distance I of at least 0.035 inch and, more preferably, of between about 0.038 and 0.041 inch. Preferably, the height J of the channel 134 is between about 0.25 and 0.35 inch greater than the received thickness of the inner peripheral portion 162.

Preferably, the top end surface 135 of the flange 133 is substantially coplanar with the top end 101A of the water closet flange 100. While the shoulder 124 as shown in the figures extends continuously and endlessly, the shoulder may be discontinuous. The shoulder 124 may be replaced with a plurality of shoulder portions spaced apart about the periphery of the flange 133.

The hub member 120 and the ring member 150 may be formed of different materials. Preferably, the hub member 120 is formed of a non-metallic material and the ring member 150 is formed of metal. Preferably, the hub member 120 is formed of a polymeric material, more preferably from PVC and/or ABS. Most preferably, the hub member 120 is formed of PVC.

Figure 9:
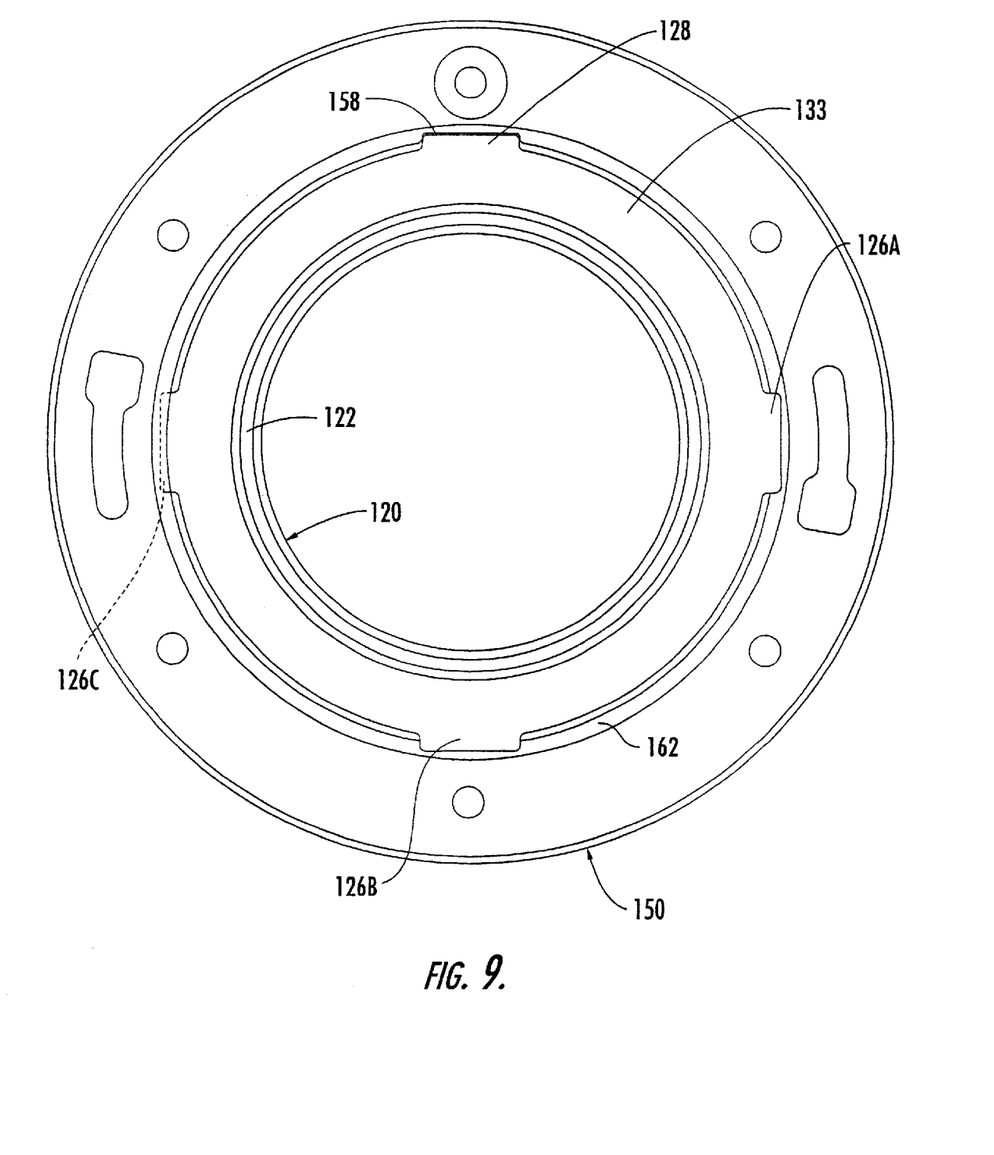
FIG. 9 is a bottom plan view of the water closet flange of FIG. 1 in a first partially assembled position.

The water closet flange 100 may be assembled using the following method according to method embodiments of the present invention. The hub member 120 is placed on a firm surface such as a work table such that the top end face 135 (FIG. 4) of the hub member 120 engages the work surface. The ring member 150 is placed top face down over the hub member 120 such that the hub member body 122 is received in the opening 151. The inner peripheral portion 162 of the ring member 150 is slid beneath the adjacent locking tabs 126A, 126B and into the channel 134 on the associated side of the hub member 120 as shown in FIG. 9. Notably, the locking tabs 126C and 128 remain disposed beneath the inner peripheral portion 162.

Before or following the step of sliding the ring member 150 beneath the locking tabs 126A, 126B, the locking tab 128 is radially aligned with the key slot 158 as shown in FIG. 9. The locking tab 128 is sized and shaped such that the locking tab 128 can pass axially through the key slot 158 without significant interference. Preferably, the length G (FIG. 6) and width H of the key slot 158 are selected to provide clearances of between about 0.032 and 0.063 inch on each of the three edges of the locking tab 128.

Figure 10:
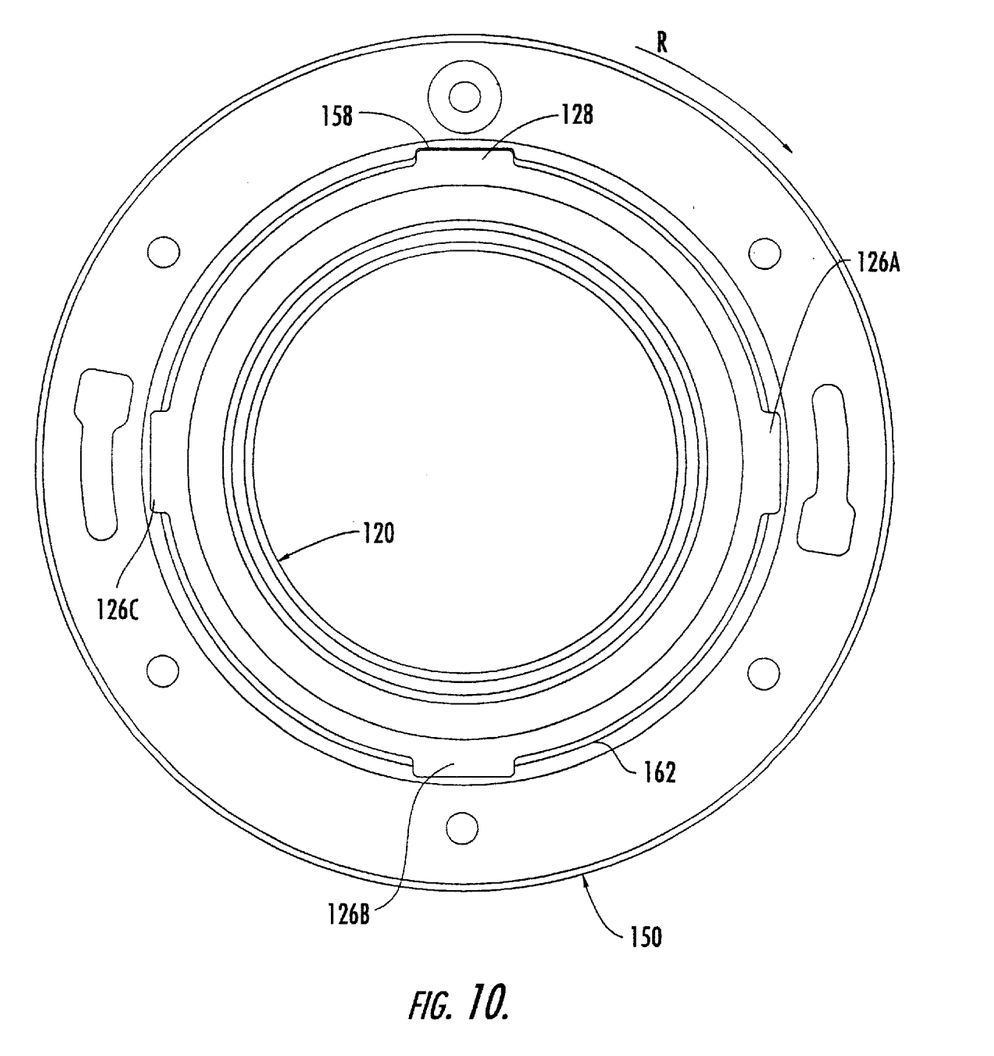
FIG. 10 is a bottom plan view of the water closet flange of FIG. 1 in a second partially assembled position.

Thereafter, the ring member 150 is forced axially downwardly onto the remaining locking tab 126C. The locking tab 126C is thereby deflected such that the inner peripheral portion 162 passes over the locking tab 126C and into the channel 134 as shown in FIG. 10. At the same time, the locking tab 128 passes through the key slot 158 uninhibited. Accordingly, a substantially reduced amount of force is required to mount the ring member 150 onto the hub member 120 as compared to methods of the prior art. The locking tab 126C is formed of a material and in a configuration such that it resiliently returns to its original orientation to seat in the channel 134.

Figure 1:
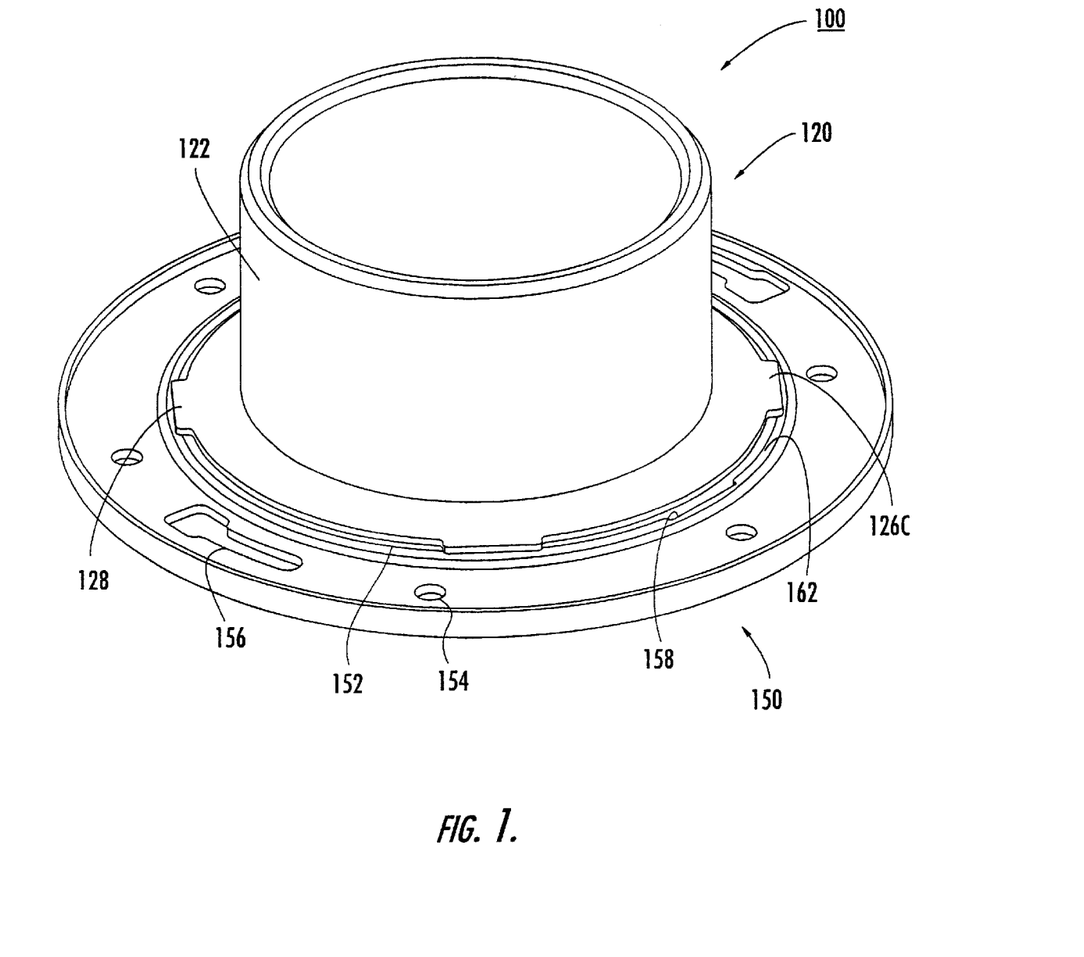
FIG. 1 is a bottom, perspective view of a composite water closet flange according to embodiments of the present invention.
Figure 2:
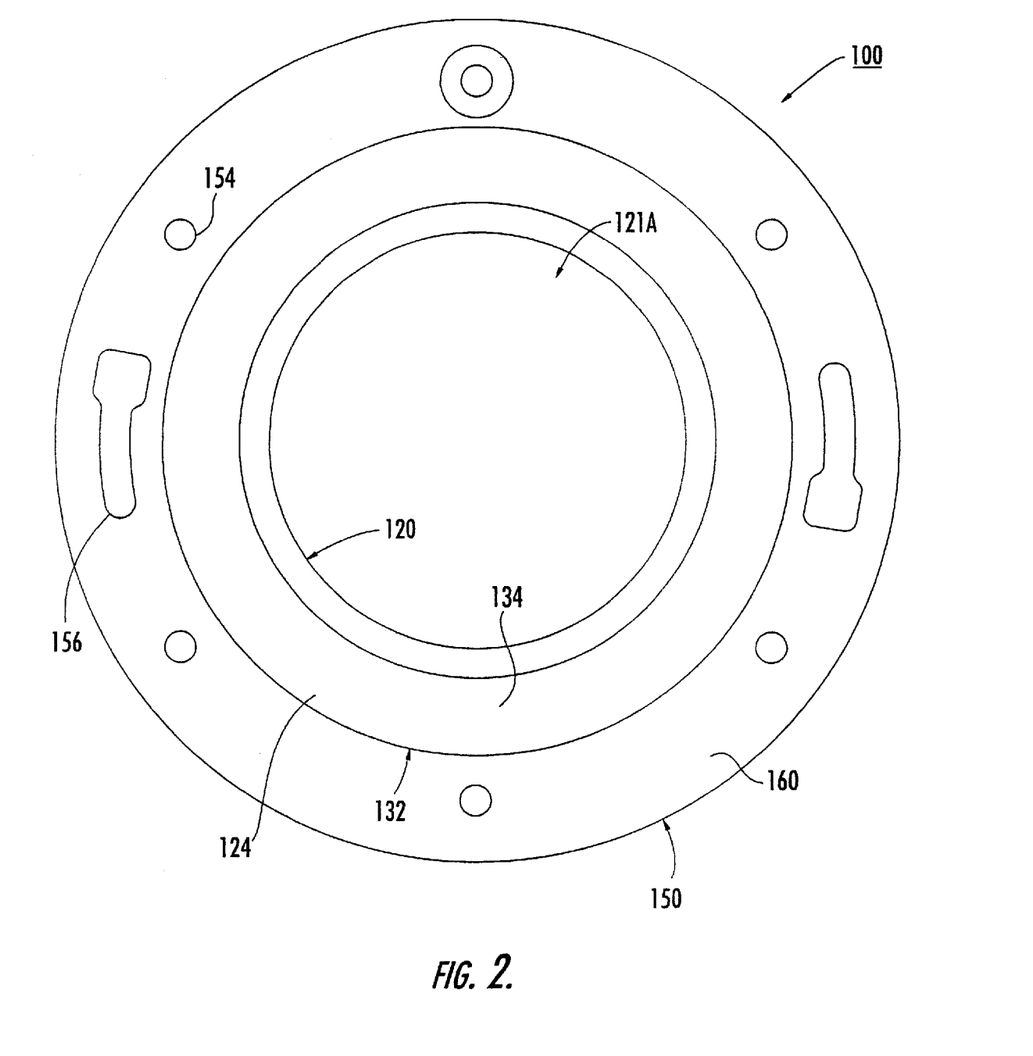
FIG. 2 is a top plan view of the water closet flange of FIG. 1.
Figure 3:
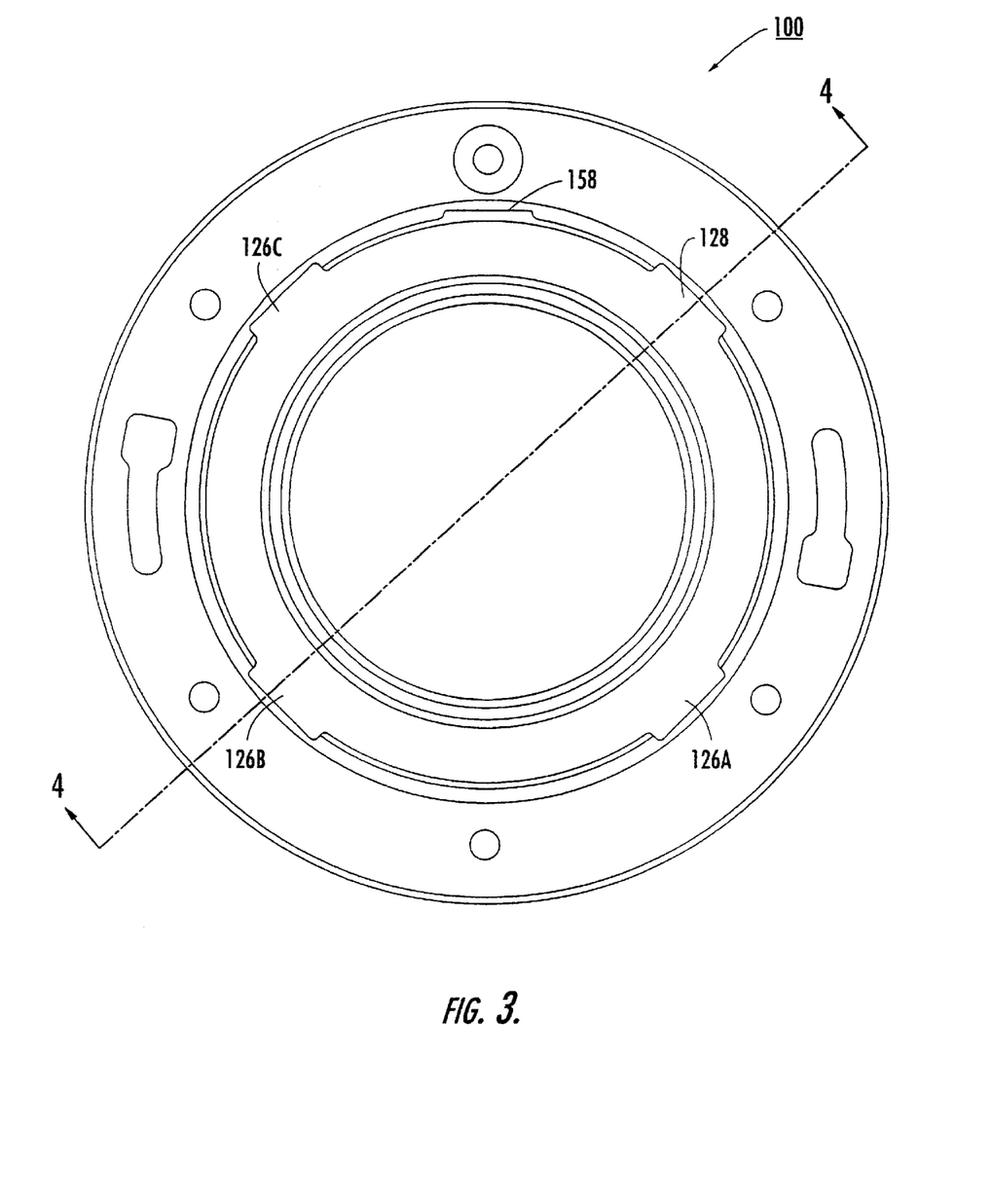
FIG. 3 is a bottom plan view of the water closet flange of FIG. 1.

Finally, the hub member 120 is rotated relative to the ring member 150, for example, in a direction R (FIG. 10), to place the locking tab 128 in an offset position with respect to the key slot 158 as shown in FIG. 3.

Because the key slot 158 reduces the force required to fully mount the ring member 150 on the hub member 120, the ring member 150 may be installed using modest force and without use of a mallet or the like. As a result, the rate of assembly of composite water closet flanges 100 may be substantially increased as compared to the rates of assembly of composite water closet flanges of the prior art. Moreover, the assembly methods of the present invention may provide reduced stresses to the locking tabs, thereby reducing the incidence of damage to the locking tabs.

Preferably, the locking tab 128 is sized and/or shaped differently than the other locking tabs 126A, 126B, 126C and the key slot 158 is sized or shaped to allow the locking tab 128, but not the locking tabs 126A, 126B, 126C, to pass through the key slot 158. In this manner, the consistency and uniformity of the strength of the coupling is improved.

Preferably, the circumferentially extending length C (FIG. 5) of the locking tab 128 is between about 0.230 and 0.200 inch less than the length E of the locking tabs 126A, 126B, 126C. Preferably, the length C is between about 0.620 and 0.630 inch. Preferably, the radially extending widths D and F of the locking tabs 126A, 126B, 126C, 128 are substantially the same and between about 0.045 and 0.055 inch.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A composite water closet flange comprising:
   a) a hub member having a hub member axis and including a connecting portion and a through-passage extending through the connecting portion, the connecting portion including:
      1) a shoulder extending radially outwardly; and
      2) a plurality of locking tabs extending radially outwardly and axially spaced apart from the shoulder; and
   b) a ring member mounted on the hub member and including:
      1) an inner peripheral portion surrounding the connecting portion and defining an opening, the inner peripheral portion including a plurality of engagement portions interposed between the shoulder and respective ones of the locking tabs; and
      2) a key slot defined in the inner peripheral portion and communicating with the opening, wherein the key slot is sized and configured to receive at least one of the plurality of locking tabs therethrough.

2. The water closet flange of claim 1 wherein the plurality of locking tabs cooperatively prevent removal of the ring member from the hub member.

3. The water closet flange of claim 1 wherein the hub member is rotatable relative to the ring member.

4. The water closet flange of claim 1 wherein the hub member includes a body portion extending axially from the connecting portion and the through-passage extends through the body portion.

5. The water closet flange of claim 1 wherein:
   the plurality of locking tabs includes a primary locking tab and a secondary locking tab that is larger than the primary locking tab; and
   the key slot is sized and configured to receive the primary locking tab, but not the secondary locking tab, therethrough.

6. The water closet flange of claim 5 wherein the primary and secondary locking tabs each have a circumferentially extending length and the length of the secondary locking tab is between about 0.210 and 0.220 inch greater than the length of the primary locking tab.

7. The water closet flange of claim 5 including a plurality of the secondary locking tabs.

8. The water closet flange of claim 7 including at least three of the secondary locking tabs.

9. The water closet flange of claim 7 wherein the plurality of locking tabs are spaced apart substantially circumferentially equidistantly about a periphery of the connecting portion.

10. The water closet flange of claim 1 wherein the hub member and the ring member are formed of different materials.

11. The water closet flange of claim 10 wherein the hub member is formed of a non-metal and the ring member is formed of metal.

12. The water closet flange of claim 11 wherein the hub member is formed of a polymeric material.

13. The water closet flange of claim 12 wherein the hub member is formed of a material selected from the group consisting of PVC and ABS.

14. The water closet flange of claim 1 wherein the ring member includes at least one mounting hole formed therein.

15. The water closet flange of claim 1 wherein the shoulder extends continuously and endlessly about the connecting portion.

16. The water closet flange of claim 1 wherein the shoulder is located on an end flange having a surface that is substantially coplanar with an end of the water closet flange.

17. The water closet flange of claim 1 wherein each of the locking tabs has a radially extending width of between about 0.625 and 0.840 inch.

18. The water closet flange of claim 1 wherein each of the locking tabs is spaced apart from the shoulder an axial distance of between about 0.045 and 0.055 inch.

19. A composite water closet flange comprising:
  a) a hub member having a hub member axis and including a connecting portion and a through-passage extending through the connecting portion, the connecting portion including:
    1) a radially extending shoulder; and
    2) a plurality of radially extending locking tabs axially spaced apart from the shoulder; and
  b) a ring member mounted on the hub member and including:
    1) a plurality of engagement portions interposed between the shoulder and respective ones of the locking tabs; and
    2) a key slot defined in the ring member, wherein the key slot is sized and configured to receive at least one of the plurality of locking tabs therethrough.

20. The water closet flange of claim 19 wherein the plurality of locking tabs cooperatively prevent removal of the ring member from the hub member.

21. The water closet flange of claim 19 wherein the hub member is rotatable relative to the ring member.

22. The water closet flange of claim 19 wherein the hub member includes a body portion extending axially from the connecting portion and the through-passage extends through the body portion.

23. The water closet flange of claim 19 wherein:
  the plurality of locking tabs includes a primary locking tab and a secondary locking tab that is larger than the primary locking tab; and
  the key slot is sized and configured to receive the primary locking tab, but not the secondary locking tab, therethrough.

24. The water closet flange of claim 23 wherein the primary and secondary locking tabs each have a circumferentially extending length and the length of the secondary locking tab is between about 0.210 and 0.220 inch greater than the length of the primary locking tab.

25. The water closet flange of claim 23 including a plurality of the secondary locking tabs.

26. The water closet flange of claims 25 including at least three of the secondary locking tabs.

27. The water closet flange of claim 26 wherein the plurality of locking tabs are spaced apart substantially circumferentially equidistantly about a periphery of the connecting portion.

28. The water closet flange of claim 19 wherein the hub member and the ring member are formed of different materials.

29. The water closet flange of claim 28 wherein the hub member is formed of a non-metal and the ring member is formed of metal.

30. The water closet flange of claim 29 wherein the hub member is formed of a polymeric material.

31. The water closet flange of claim 30 wherein the hub member is formed of a material selected from the group consisting of PVC and ABS.

32. The water closet flange of claim 19 wherein the ring member includes at least one mounting hole formed therein.

33. The water closet flange of claim 19 wherein the shoulder extends continuously and endlessly about the connecting portion.

34. The water closet flange of claim 19 wherein the shoulder is located on an end flange having a surface that is substantially coplanar with an end of the water closet flange.

35. The water closet flange of claim 19 wherein each of the locking tabs has a radially extending width of between about 0.625 and 0.840 inch.

36. The water closet flange of claim 19 wherein each of the locking tabs is spaced apart from the shoulder an axial distance of between about 0.045 and 0.055 inch.

37. A hub member for use with a ring member having a key slot to form a composite water closet flange, the hub member having a hub member axis and comprising a connecting portion and a through-passage extending through the connecting portion, the connecting portion including:
  a) a shoulder extending radially outwardly;
  b) a primary locking tab extending radially outwardly and axially spaced apart from the shoulder, the primary locking tab being sized and configured to allow the primary locking tab to pass through the key slot; and
  c) a secondary locking tab extending radially outwardly and axially spaced apart from the shoulder, the secondary locking tab being sized and configured to prevent the secondary locking tab from passing through the key slot.

38. The hub member of claim 37 further including a body portion extending axially from the connecting portion and wherein the through-passage extends through the body portion.

39. The hub member of claim 37 wherein the primary and secondary locking tabs each have a circumferentially extending length and the length of the secondary locking tab is between about 0.210 and 0.220 inch greater than the length of the primary locking tab.

40. The hub member of claim 37 including a plurality of the secondary locking tabs.

41. The hub member of claim 40 including at least three of the secondary locking tabs.

42. The hub member of claim 40 wherein the plurality of locking tabs are spaced apart substantially circumferentially equidistantly about a periphery of the connecting portion.

43. The hub member of claim 37 wherein the hub member is formed of a polymeric material.

44. The hub member of claim 43 wherein the hub member is formed of a material selected from the group consisting of PVC and ABS.

45. The hub member of claim 37 wherein the shoulder extends continuously and endlessly about the connecting portion.

46. The hub member of claim 37 wherein each of the primary and secondary locking tabs has a radially extending width of between about 0.625 and 0.840 inch.

47. The hub member of claim 37 wherein each of the locking tabs is spaced apart from the shoulder an axial distance of between about 0.045 and 0.055inch.

48. A method of assembling a water closet flange, the method comprising:
  a) providing a hub member having a hub member axis and including a connecting portion and a through-passage extending through the connecting portion, the connecting portion including:
  1) a shoulder extending radially outwardly; and
  2) first and second locking tabs extending radially outwardly and axially spaced apart from the shoulder;
b) providing a ring member including an inner peripheral portion defining an opening and a key slot defined in the inner peripheral portion and communicating with the opening, wherein the key slot is sized and configured to receive at least one of the first and second locking tabs therethrough;
c) positioning the connecting portion of the hub member in the opening of the ring member such that the inner peripheral portion is interposed between the second locking tab and the shoulder;
d) positioning the connecting portion of the hub member in the opening of the ring member such that the first locking tab is axially aligned with the key slot; and
e) axially displacing the first locking tab through the key slot.

49. The method of claim 48 further including rotating the hub member and the ring member relative to one another about the hub member axis such that engagement portions of the inner peripheral portion are interposed between each of the first and second locking tabs and the shoulder.

50. The method of claim 49 wherein the step of axially displacing the first locking tab through the key slot includes pressing a third locking tab into abutment with the ring member such that the third locking tab deflects and passes through the opening.

51. The method of claim 49 wherein the step of positioning the connecting portion of the hub member includes interposing the inner peripheral portion between a fourth locking tab and the shoulder.

52. The method of claim 51 wherein the first, second, third and fourth locking tabs are spaced apart substantially circumferentially equidistantly about a periphery of the connecting portion.

53. The method of claim 50 further including securing the water closet flange to a mounting surface using a fastener inserted through a mounting hole in the ring member.

* * * * *

UNITED STATES PATENT AND TRADEMARK OFFICE
CERTIFICATE OF CORRECTION

PATENT NO. : 6,598,241 B1
DATED : July 29, 2003
INVENTOR(S) : Robert M. Williams It is certified that error appears in the above-identified patent and that said Letters Patent is hereby corrected as shown below:

Column 10,
Line 11, should read:
51. The method of claim 50 wherein the step of positioning the connecting portion of the hub member includes interposing the inner peripheral portion between a fourth locking tab and the shoulder.

Line 19, should read:
53. The method of claim 49 further including securing the water closet flange to a mounting surface using a fastener inserted through a mounting hole in the ring member.

Signed and Sealed this

Twenty-third Day of December, 2003

JAMES E. ROGAN
*Director of the United States Patent and Trademark Office*